US010725892B2

(12) United States Patent
Michalski

(10) Patent No.: US 10,725,892 B2
(45) Date of Patent: Jul. 28, 2020

(54) METHOD AND SYSTEM FOR AUTOMATED TESTING OF A GRAPHICAL USER INTERFACE FOR CUSTOMER DEVICES

(71) Applicant: Advanced Digital Broadcast S.A., Eysins (CH)

(72) Inventor: Przemyslaw Michalski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 0 days.

(21) Appl. No.: 16/202,141

(22) Filed: Nov. 28, 2018

(65) Prior Publication Data

US 2019/0163612 A1    May 30, 2019

(30) Foreign Application Priority Data

Nov. 30, 2017    (EP) .................................... 17461637

(51) Int. Cl.
| | | |
|---|---|---|
| *G06F 9/44* | (2018.01) | |
| *G06F 11/36* | (2006.01) | |
| *G06F 9/451* | (2018.01) | |
| *G06K 9/62* | (2006.01) | |
| *G06K 9/32* | (2006.01) | |

(52) U.S. Cl.
CPC .......... *G06F 11/3664* (2013.01); *G06F 9/451* (2018.02); *G06F 11/368* (2013.01); *G06F 11/3688* (2013.01); *G06K 9/325* (2013.01); *G06K 9/6215* (2013.01); *G06K 2209/01* (2013.01)

(58) Field of Classification Search
CPC .... G06F 9/451; G06F 11/3664; G06F 11/368; G06F 11/3688; G06K 9/325; G06K 9/6215; G06K 2209/01
USPC .................. 717/110–116, 124–125, 134–135
See application file for complete search history.

(56) References Cited

U.S. PATENT DOCUMENTS

| | | | | |
|---|---|---|---|---|
| 7,689,613 | B2 * | 3/2010 | Candelore .............. | G06K 9/325 707/707 |
| 8,629,942 | B2 * | 1/2014 | Candelore ............ | H04N 5/4403 340/12.29 |
| 8,775,970 | B2 * | 7/2014 | Pan ....................... | G06F 3/0487 715/716 |
| 8,881,195 | B2 * | 11/2014 | Clements ............... | H04N 17/04 725/135 |
| 9,774,912 | B2 * | 9/2017 | Friel ...................... | H04H 60/32 |

(Continued)

OTHER PUBLICATIONS

Fang et al., "Design and Implementation of Graphical User Interface of Digital STB", 2012, Citcs, Atlantis Press, pp. 820-822 (Year: 2012).*

(Continued)

*Primary Examiner* — Ted T. Vo
(74) *Attorney, Agent, or Firm* — Mark M. Friedman

(57) ABSTRACT

A computer-implemented method for automated testing of a graphical user interface (GUI) for a customer device, the method comprising: receiving GUI navigation keys (801); automated learning (802) of the GUI MENU structure by navigating the GUI to create a GUI structure file comprising the screen header text and the screen image for each sub-MENU detected in the MENU structure; receiving (803) data related to the sub-MENU to be tested; performing (804) a testing procedure on the sub-MENU.

7 Claims, 10 Drawing Sheets

(56) References Cited

U.S. PATENT DOCUMENTS

| | | | | |
|---|---|---|---|---|
| 9,866,899 B2* | 1/2018 | Dureau | ................... | H04N 5/50 |
| 2007/0106945 A1* | 5/2007 | Kim | ................... | G06F 3/03547 |
| | | | | 715/740 |
| 2017/0083423 A1* | 3/2017 | Freed | ................... | G06F 11/263 |

OTHER PUBLICATIONS

Kovacevic et al., "Framework for Automatic Testing of Set-Top Boxes", 2014, IEEE, pp. 1091-1094 (Year: 2014).*

Guru99, "Complete Guide for GUI Testing", 2016, retrieved from https://web.archive.org/web/20161119171633/https://www.guru99.com/gui-testing.html , 9 pages (Year: 2016).*

White paper, "Blu-ray Disc™ Format", 2010, Blu-ray Disc Association, 46 pages (Year: 2010).*

* cited by examiner

```xml
<menu>
    <item id="1">
        <name>User settings</name>
        <link>image1.jpg</link>
            <item id="1.1">
                <name>Power Saving</name>
                <link>image1.1.jpg</link>
            </item>
            <item id="1.2">
                <name>Display Options</name>
                <link>image1.2.jpg</link>
            </item>
            <item id="1.3">
                <name>Recording Options</name>
                <link>image1.3.jpg</link>
            </item>
            <item id="1.4">
                <name>Language Options</name>
                <link>image1.4.jpg</link>
            </item>
    </item>
    <item id="2">
        <name>Installation</name>
        <link>image3.jpg</link>
            <item id="2.1">
                <name>Channel Search</name>
                <link>image2.1.jpg</link>
            </item>
                <item id="2.2.1">
                    <name>Quick Scanning</name>
                    <link>image2.2.1.jpg</link>
                </item>
                <item id="2.2.2">
                    <name>Advanced Scanning</name>
                    <link>image2.2.2.jpg</link>
                </item>
            </item>
            <item id="2.2">
                <name>Receiver Upgrade</name>
                <link>image2.2.jpg</link>
            </item>
            <item id="2.3">
                <name>Factory Reset</name>
                <link>image2.3.jpg</link>
            </item>
            <item id="2.4">
                <name>Network Configuration</name>
                <link>image2.4.jpg</link>
            </item>
            <item id="2.5">
                <name>Audio mode</name>
                <link>image2.5.jpg</link>
            </item>
    </item>
</menu>
```

Fig. 7

```
api.pressKey("MENU")      #sending MENU key
api.sleep(1)              #waiting a second to send an RCU command
api.pressKey("OK")        #looking for appropriate sub-MENU
api.sleep(1)
api.pressKey("RIGHT")
api.sleep(1)
api.pressKey("RIGHT")
api.sleep(1)
api.pressKey("OK")
api.sleep(1)
api.pressKey("DOWN")
api.sleep(1)
api.pressKey("OK")
api.sleep(1)
text = api.ocr.getText(20,30,40,40)    # reading parental level from MENU
api.sleep(1)
print text  # displaying parental level during test
```

METHOD AND SYSTEM FOR AUTOMATED TESTING OF A GRAPHICAL USER INTERFACE FOR CUSTOMER DEVICES

TECHNICAL FIELD

The present disclosure relates to a method for automated testing of a graphical user interface for customer devices.

BACKGROUND

Customer devices (like digital television Set Top Boxes, Blu-ray players etc.) are operated by users typically via a graphical user interface (GUI) of the device. The GUI may vary between devices, depending on the device specification and functionality. It is important for the devices that reach the market to be free of programming bugs or erroneously designed user interfaces, which could result in a device hanging up during user navigation through the menu. Therefore, new designs of devices are tested before starting mass production or sales.

There are known automated methods for testing a graphical user interface. However, the known methods require providing test steps to a test script engine of a test case. The test steps are remote control unit (RCU) commands which need to be sent to a device under the test to result in a particular action on the screen—for example, to enter a desired sub-menu of the GUI and to change some settings in this menu. When the test case is created, it can be run many times on many different software types for same device under the test. A problem appears when a structure of the GUI in the software of the tested device changes and the test case parameters have to be updated. The testing person (tester) must provide new steps—i.e. a new or an additional command must be sent to enter the same sub-menu as previously to change some settings. The tester must also check manually if the new steps result in activating the required sub-menu. This causes additional workload in the test procedure and creates additional time and labour costs.

Therefore, there is a need to provide a method for automatic testing of the GUI of customer devices, which would not require providing test steps which are only suitable for a single testing procedure (for a single device).

SUMMARY

There is disclosed a computer-implemented method for automated testing of a graphical user interface (GUI) for a customer device, the method comprising: receiving GUI navigation keys; automated learning of the GUI MENU structure by navigating the GUI to create a GUI structure file comprising the screen header text and the screen image for each sub-MENU detected in the MENU structure; receiving data related to the sub-MENU to be tested; performing a testing procedure on the sub-MENU.

The automated learning may comprise the steps of: receiving data defining to navigation keys for the GUI; receiving data defining a MENU key for the GUI; activating the MENU key in order to call a main menu; analyzing a currently viewed video screen by an OCR engine; checking if the currently viewed screen is different from the previous screen and if so, storing the screen header text and the screen image in the structure file; activating a confirmation key to go deeper in the structure of the MENU; analyzing the currently viewed video screen by an OCR engine; checking if the currently viewed screen is different from the previous screen and if so, returning to step and if not, activating one of the navigation keys to enter neighbor levels in the structure of the MENU; checking if the currently viewed screen is different from the previous screen and if so, checking if the currently viewed screen is already known and if not, returning to step, and otherwise using a return navigation key to go back to a higher level of the MENU; checking if the currently viewed screen is different from the previous screen and if so, returning to step.

Receiving data related to the sub-MENU may include receiving the screen header name or an image file.

The method may comprise, during automated learning, creating the structure file additionally comprising an identification number (id) of each screen which indicates its position in the MENU structure.

The method may comprise, during the testing procedure, detecting a text displayed in a particular region of the screen and comparing the text with an expected value.

There is also disclosed a computer-implemented system for automated testing of a graphical user interface (GUI) for a customer device, the system comprising a system unit with a central processing unit configured to perform the steps of the method as described herein.

There is also disclosed a computer program comprising program code means for performing all the steps of the computer-implemented method as described herein when said program is run on a computer, as well as a computer readable medium storing computer-executable instructions performing all the steps of the computer-implemented method as described herein when executed on a computer.

BRIEF DESCRIPTION OF DRAWINGS

The method presented herein is presented by means of example embodiments on a drawing, wherein:

FIG. 7 presents a file with a structure of the GUI example shown in FIG. 6;

FIG. 8A presents a prior art approach for providing test steps in a test case;

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

In the present disclosure, the term "video content" is to be understood more broadly as multimedia content comprising video data and associated audio data and associated additional data (such as content description, etc.). The term "video content" is used to distinguish the content from other content types, such as still images or raw data (e.g. files).

DETAILED DESCRIPTION

Figure 1:
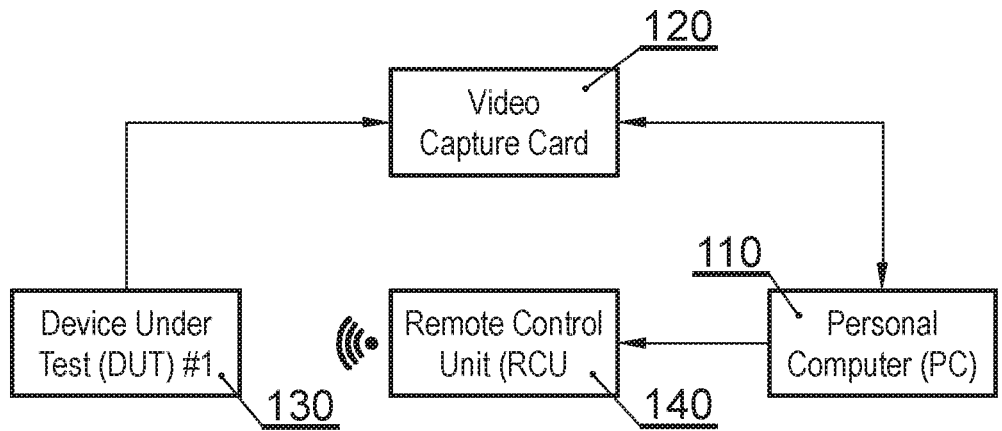
FIG. 1 presents an overview of a system for automated testing of a graphical user interface.

FIG. 1 presents an overview of a system for automated testing of a graphical user interface (GUI). The system comprises a video capture card 120 which captures video data of a screen of a Device Under Test (DUT) 130. The captured video data is processed by a personal computer (PC) 110, which after analyzing the captured video data sends signals to the DUT 130 by means of a remote control unit (RCU) 140 in order to navigate through the menu of the DUT.

Figure 2:
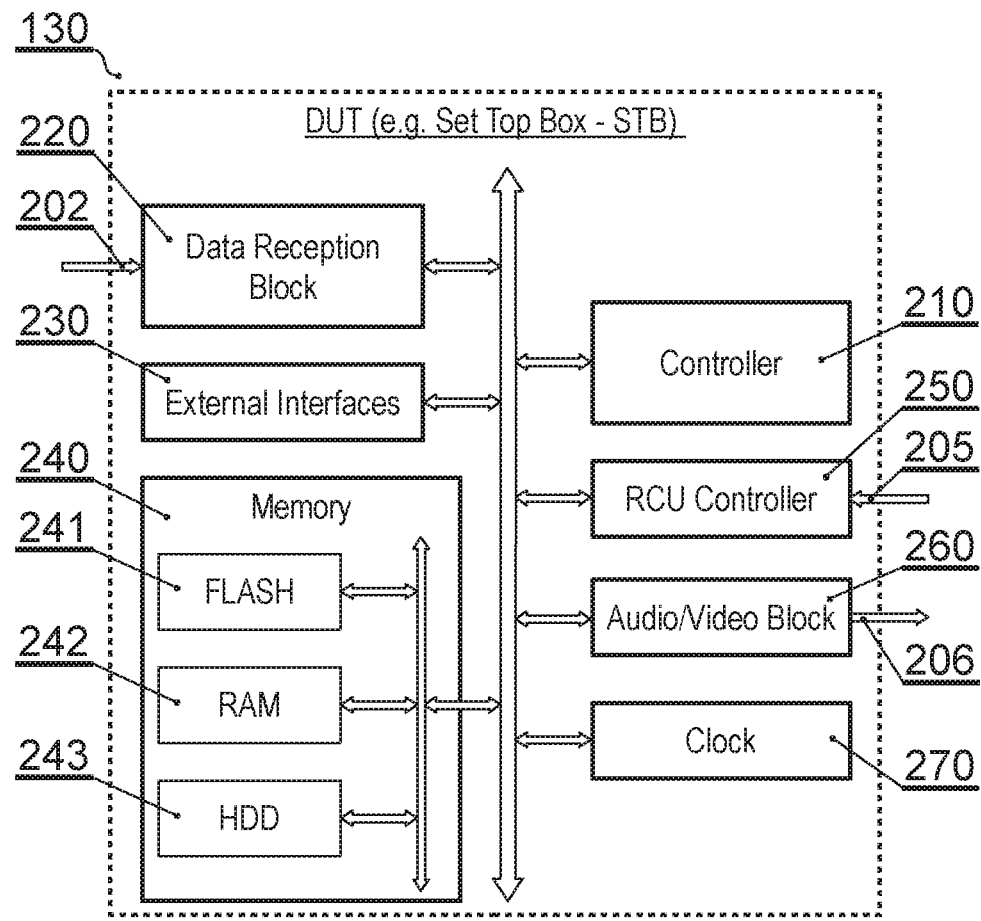
FIG. 2 presents a structure of a Device Under Test (DUT), for example a Set Top Box (STB)

FIG. 2 presents a structure of the Device Under Test, for example a Set Top Box (STB).

A controller 210 comprises a plurality of units configured to provide the functionality of the system as described herein.

The STB 130 operates utilizing memory blocks 250, including RAM 252, Flash 251 blocks and a hard disk drive (HDD) 253 or another type of mass storage that can be used to store video or other data locally at the STB, but is not essential for its operation.

A clock module 270 is configured to provide timing data necessary for cooperation of the device units.

A data reception block 220 is configured to receive downstream data 202, such as video content, from the broadcasting distribution network. The data reception block 220 (also called a front-end block) may comprise a plurality of tuners (such as satellite, cable, terrestrial or IPTV tuners), wherein one of the tuners receives content to be displayed at the television screen to which the STB is directly connected (e.g. the STB 130 connected to the TV set) and another tuner receives content to be recorded at the HDD 253.

External interfaces 230, such as the Ethernet interface, are configured to communicate, via at least one transmission channel, with the Ethernet (IP) network or the wireless network, in order to receive applications and/or content recommendation data, as well as to transmit user or STB statistic data.

The STB is operable by the user via a remote control unit (RCU) that communicates, typically via an infrared (IR) receiver receiving an IR signal 205, with a RCU controller block 250.

An audio/video block 260 is an example of a content presentation block and configured to decode the received content, convert it to an audio/video format suitable for presentation to the user, and transmit the converted content via a transmission channel 206 to a TV set to which the STB is directly connected.

All modules of the STB communicate with each other via one or more internal data buses.

Figure 3:
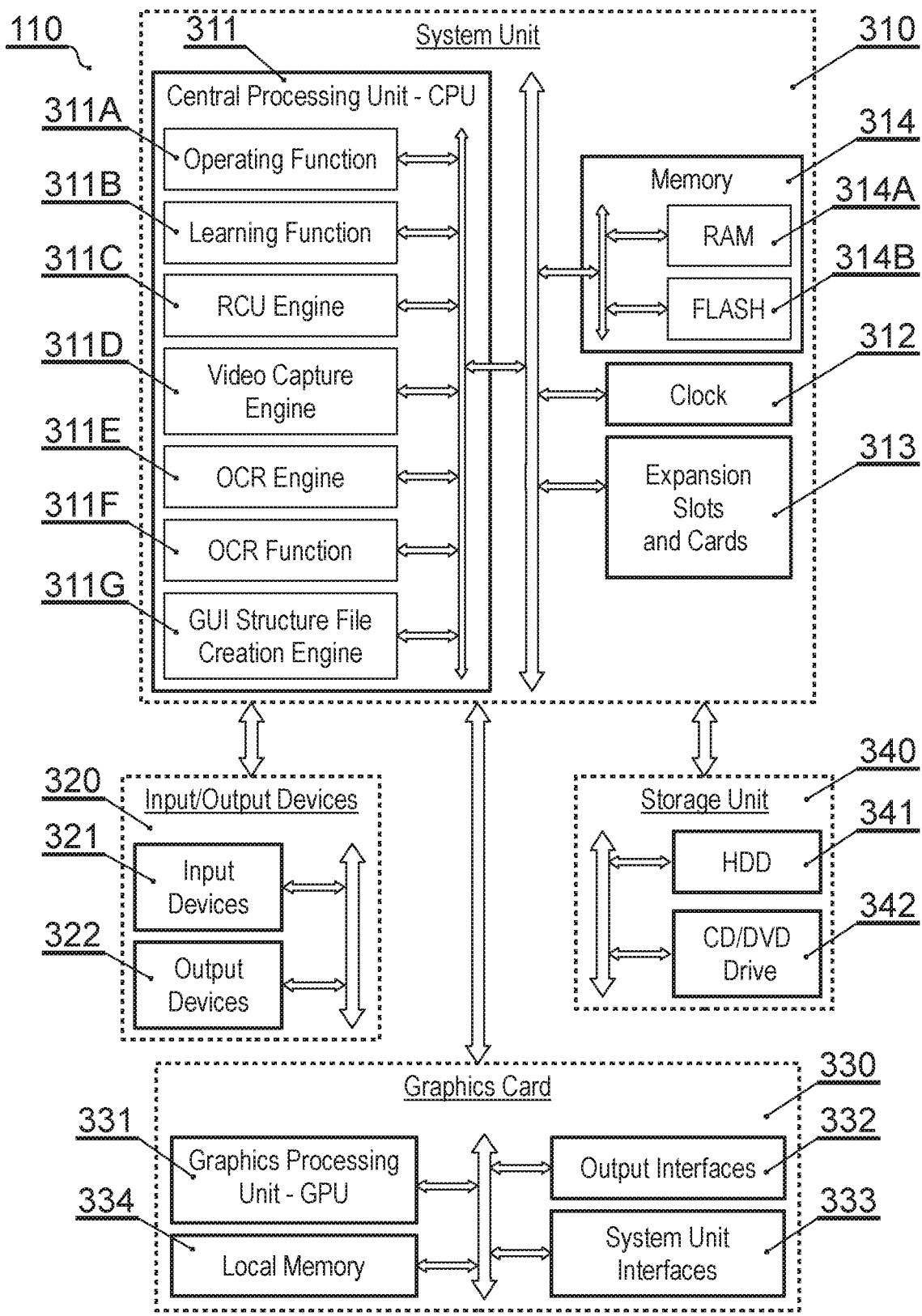
FIG. 3 presents a structure of a personal computer (PC) 110.

FIG. 3 presents a structure of the personal computer (PC) 110. The PC 110 operates utilizing memory blocks 314, including RAM 314A, Flash 314B blocks and a storage unit 340 with a hard disk drive (HDD) 341 and a CD/DVD Drive 342.

A clock module 312 is configured to provide timing data necessary for cooperation of the system units.

Expansion Slots and Cards 313 provide additional abilities, extensions of the system if necessary.

A Central Processing Unit (CPU) 311 of the PC 110 comprises an operating function block 311A for navigating through the graphical user interface, a learning function block 311B for learning the structure of a graphical user interface, an RCU engine block 311C for sending commands to the DUT, a video capture engine block 311D for capturing data from a video screen, an OCR (Optical Character Recognition) engine 311E and OCR function block 311F for understanding data presented in the video screen and a GUI structure file creation unit 311G for storing the recognized header texts or screen names in a regular file which is stored in the storage memory unit 340 for example on the HDD 341. The data between the presented functions and engines blocks are exchanged over the RAM memory unit 314A.

The PC 110 comprises also Input/Output devices 320, where input devices 321 are for example a keyboard, a mouse, a touchpad, a video capture card and output devices 322 are for example a display, a printer, an IR RCU.

A graphics card 330 of the PC has a graphics processing unit (GPU) 331, a local memory unit 334, output interfaces 332 and system unit interfaces 333.

Figure 4A:
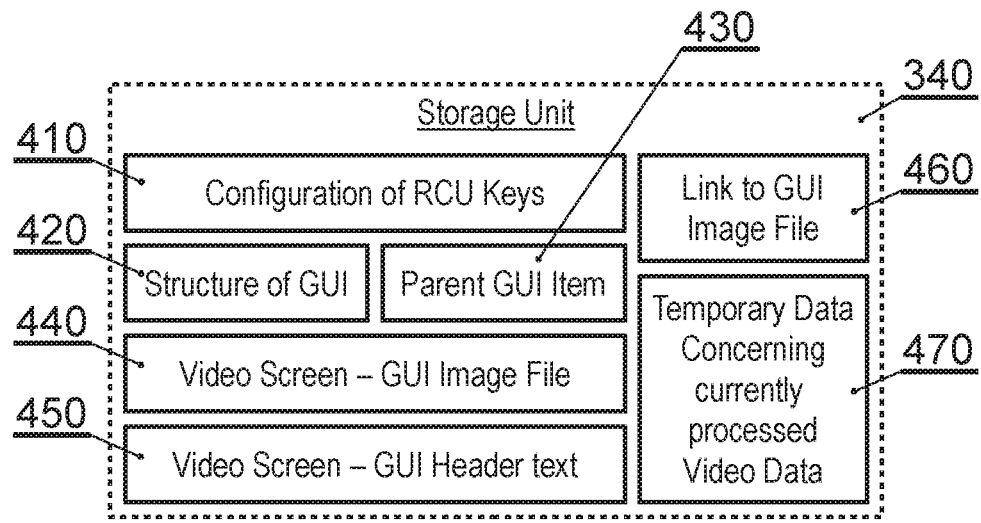
FIG. 4A presents data stored in a storage unit 340 of the system unit.

FIG. 4A presents data stored in the storage unit 340 of the system unit. Data is stored in containers, such as tables, files or other data types.

An RCU keys configuration 410 comprises information concerning available control keys of the RCU unit.

A structure of a GUI 420 comprises information concerning elements of the GUI, screen names, titles and screens arrangement.

A parent GUI item 430 comprises information concerning the parent screen of the currently viewed screen.

A GUI image file 440 stores a photo of the captured video screen.

A GUI header text 450 stores textual information of the captured video screen.

A link to the GUI image file is stored in a block 460.

Temporary data concerning currently processed video data are stored in a block 470.

Figure 4B:
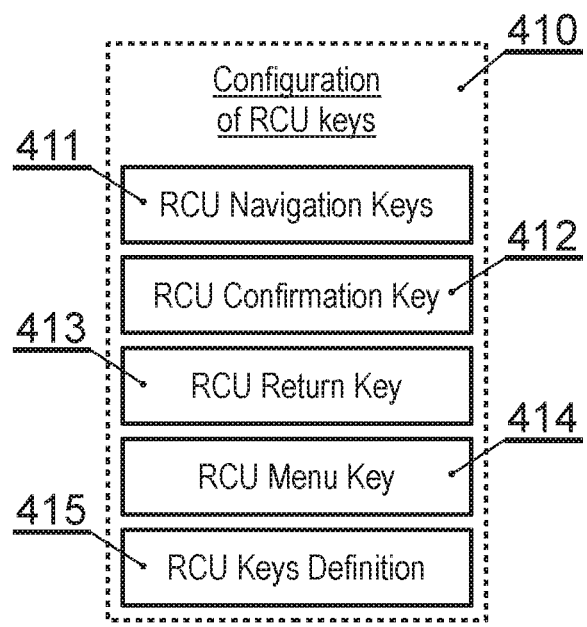
FIG. 4B presents an example of data stored in a RCU keys configuration block 410.

FIG. 4B presents an example of data stored in the RCU keys configuration block 410. An RCU navigation keys 411 block comprises information concerning the keys for browsing through the screens of the GUI. A RCU confirmation key 412 block comprises information concerning the keys used for confirming an action or entering to the submenu screen. A RCU return key 413 block comprises information concerning the keys used for navigating one step back/up. A RCU menu key 414 block comprises information concerning the key used for returning to the main menu or calling the menu screen. A RCU keys definition 415 block comprises information concerning the definitions of RCU keys (name of a key, IR data of this RCU key—such as a copy of the IR signals produced by the RCU when that key is activated).

Figure 5:
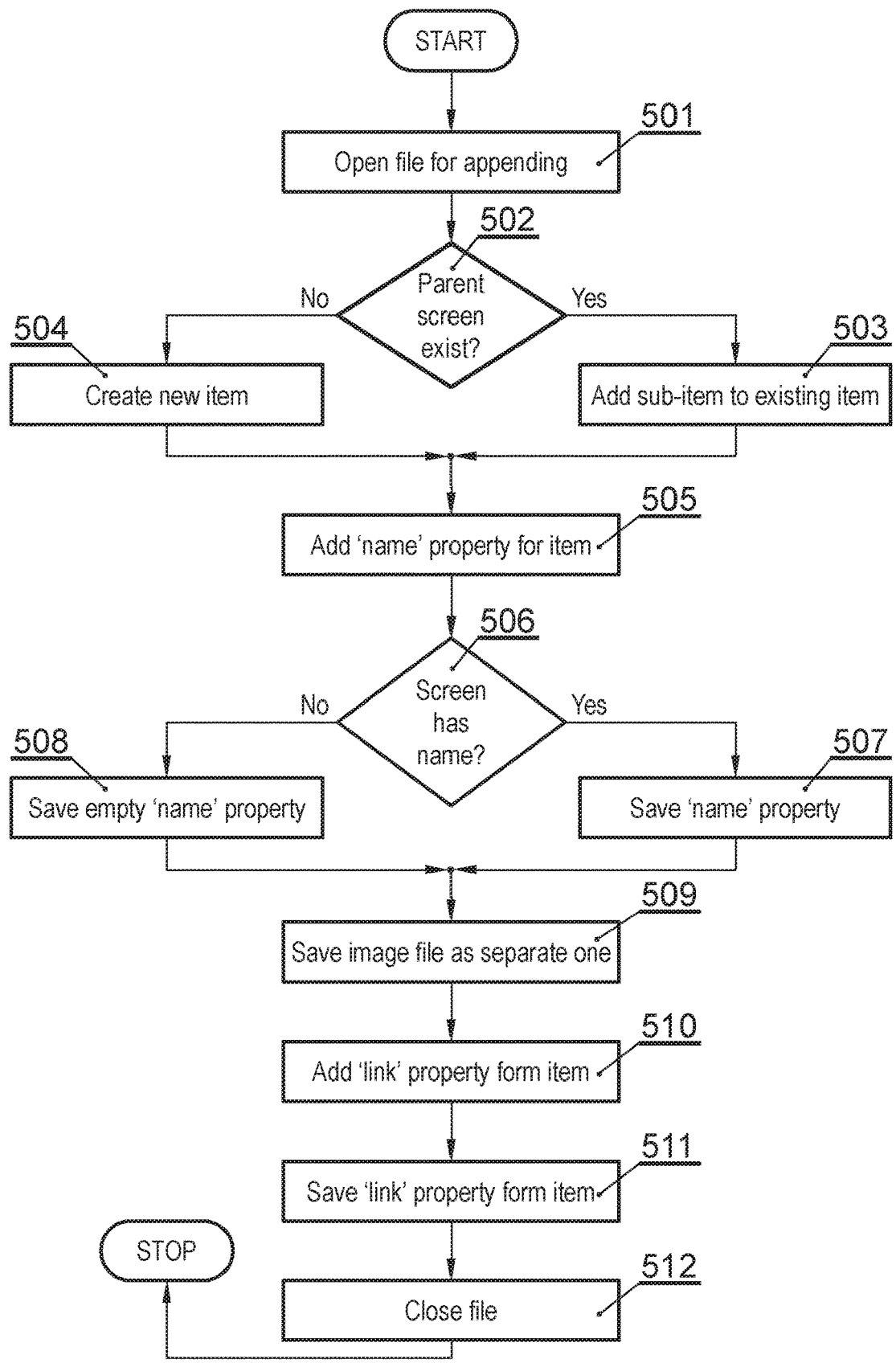
FIG. 5 presents a flow chart of a process of creating a structure file of a GUI.

FIG. 5 presents a flow chart of the process of creating a structure file of a GUI. In the first step 501 a file is opened for appending. In step 502 it is checked if an indication of a parent screen exists in the file. If no, then in step 504 a new parent item is created. If the parent item already exists then in step 503 a sub-item is added to the existing item. The items may have a form of an identification number ID, which indicates their position in the structure of the menu. Next, in step 505 a 'name' property is added for the previously added item. Next in step 506 it is checked if the added item—a screen, has a name. If not, the empty 'name' property is stored, otherwise the name of the screen is stored under the 'name' property. In step 509 an image of the screen is stored as a separate file. Next in step 510 a 'link' property is added for the item and in step 511 the path/name of the image file is stored in the 'link' property. Finally in step 512 the file is closed.

Figure 6:
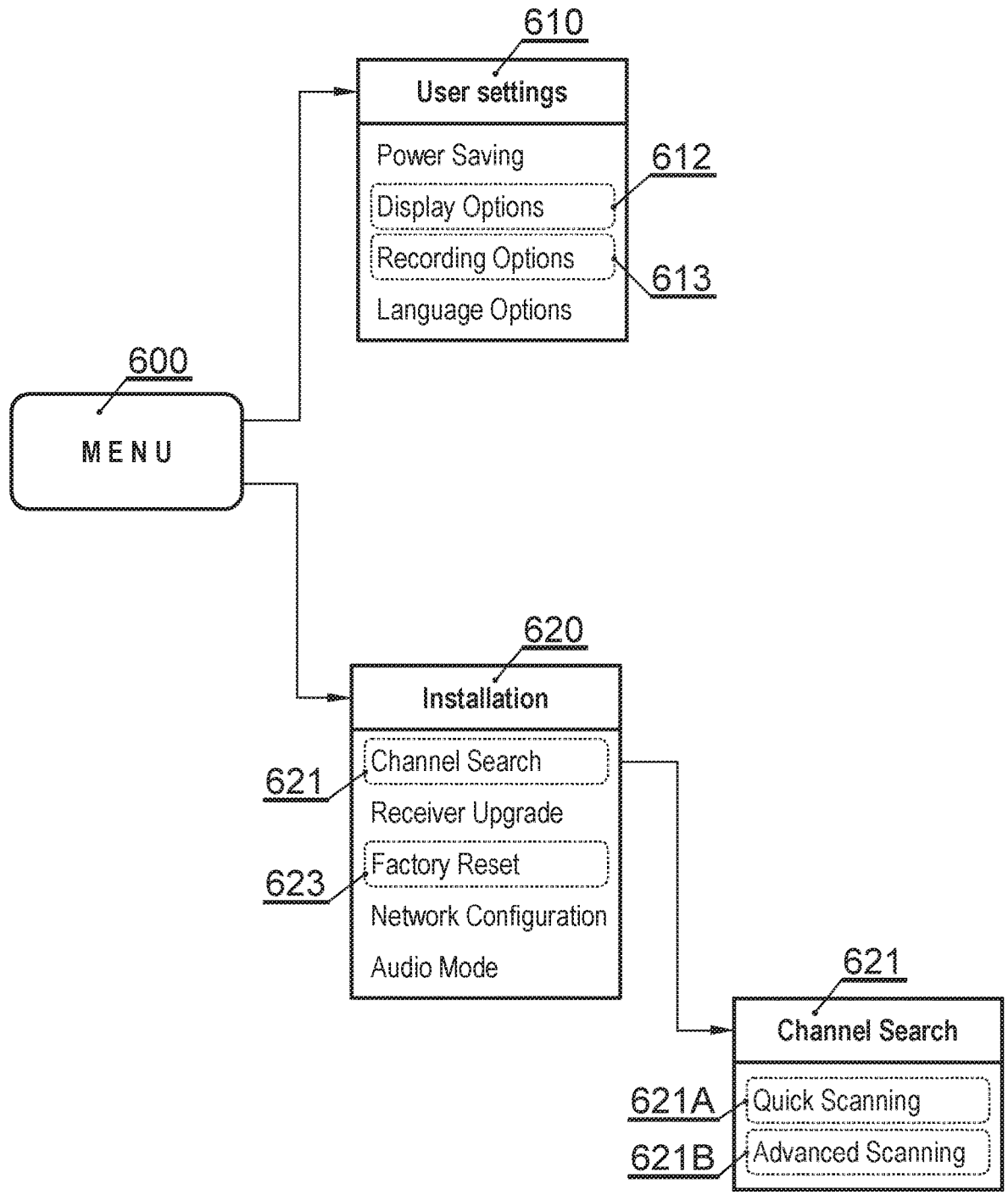
FIG. 6 presents an example of a GUI.

FIG. 6 presents an example of a GUI where a main menu screen 600 comprises two sub-menus, the user settings 610 and the installation 620. The user settings 610 further comprises several sub-menus like display options 612, recording options 613 etc. Also, the installation menu 620 further comprises sub-menus like factory reset 623 or channel search 621 which further comprises a quick scanning 621A and advanced scanning 621B options.

FIG. 7 presents a file with a structure of the GUI example shown in FIG. 6. The file stores names of all GUI screens, their IDs and links to the image files corresponding to the particular screen.

FIG. 8A presents a prior art approach for providing test steps 810 in a test case, wherein the test steps are unique and suitable only for a specified type or model of the tested device. In such approach for each element or screen of the GUI, a specific path (test steps) has to be provided.

Figure 8B:
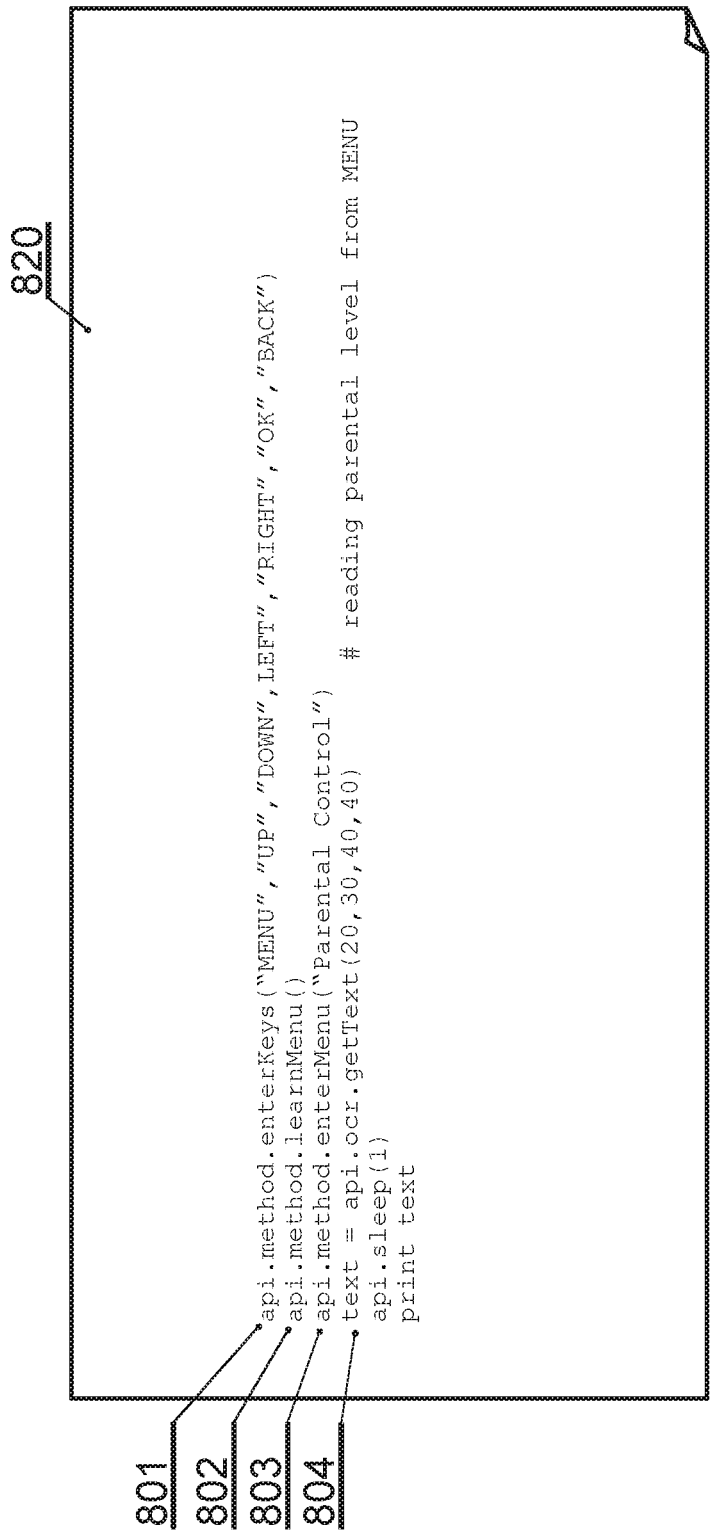
FIG. 8B presents a practical presentation of the method according to the invention.

FIG. 8B presents a practical presentation 820 of the method according to the invention. First, in step 801, the tester provides definitions of MENU navigation keys. Next, in step 802, the method will automatically learn (using the learning function, as described with reference to FIGS. 9A-9B) how to enter each sub-MENU, by navigating the GUI to create a GUI structure file (as presented in FIG. 7) comprising the screen header text and the screen image for each sub-MENU detected in the MENU structure. In step 803 the tester provides data related to the screen header or an image file of the sub-MENU to be tested. In the presented example, the tester requested to enter a menu corresponding to the header text "Parental Control". Next, in step 804, typical testing action related to that sub-MENU is executed, such as checking whether the menu exists, whether it is compliant with requirements, whether some portion of the menu displays expected value (as shown in FIG. 8B to test what is the text displayed in the rectangle having top-left coordinates (20, 30) and bottom-right coordinates (40,40)— the expected placement of the parental level in the "Parental Control" sub-MENU). Alternatively, the tester might have input in step 803 an image file and the testing procedure in step 804 could relate to determining whether the GUI structure file comprises such image, to determine whether a particular sub-MENU is present in the MENU.

Figure 9A:
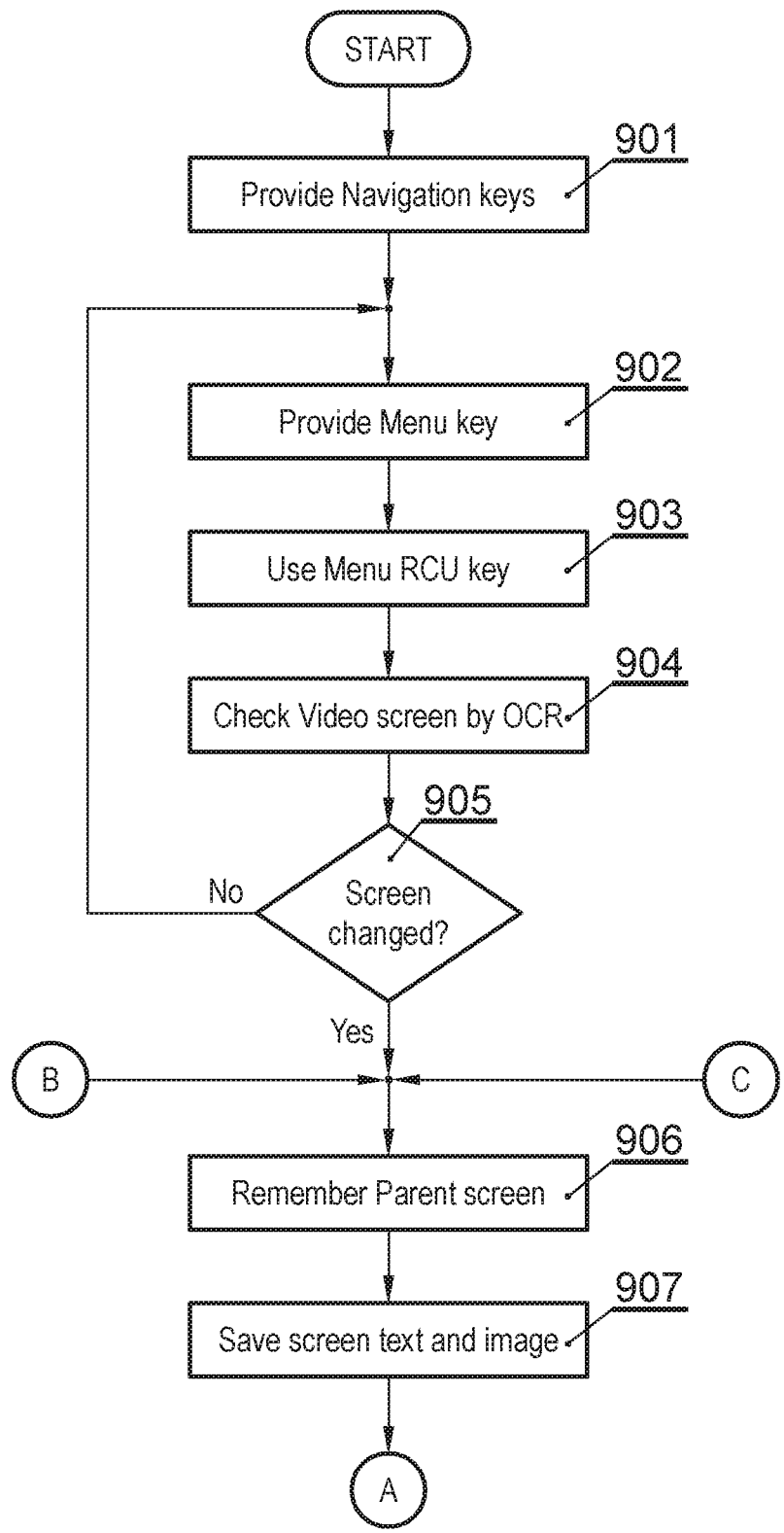
FIGS. 9A-9B present a learning function of the method according to the invention.
Figure 9B:
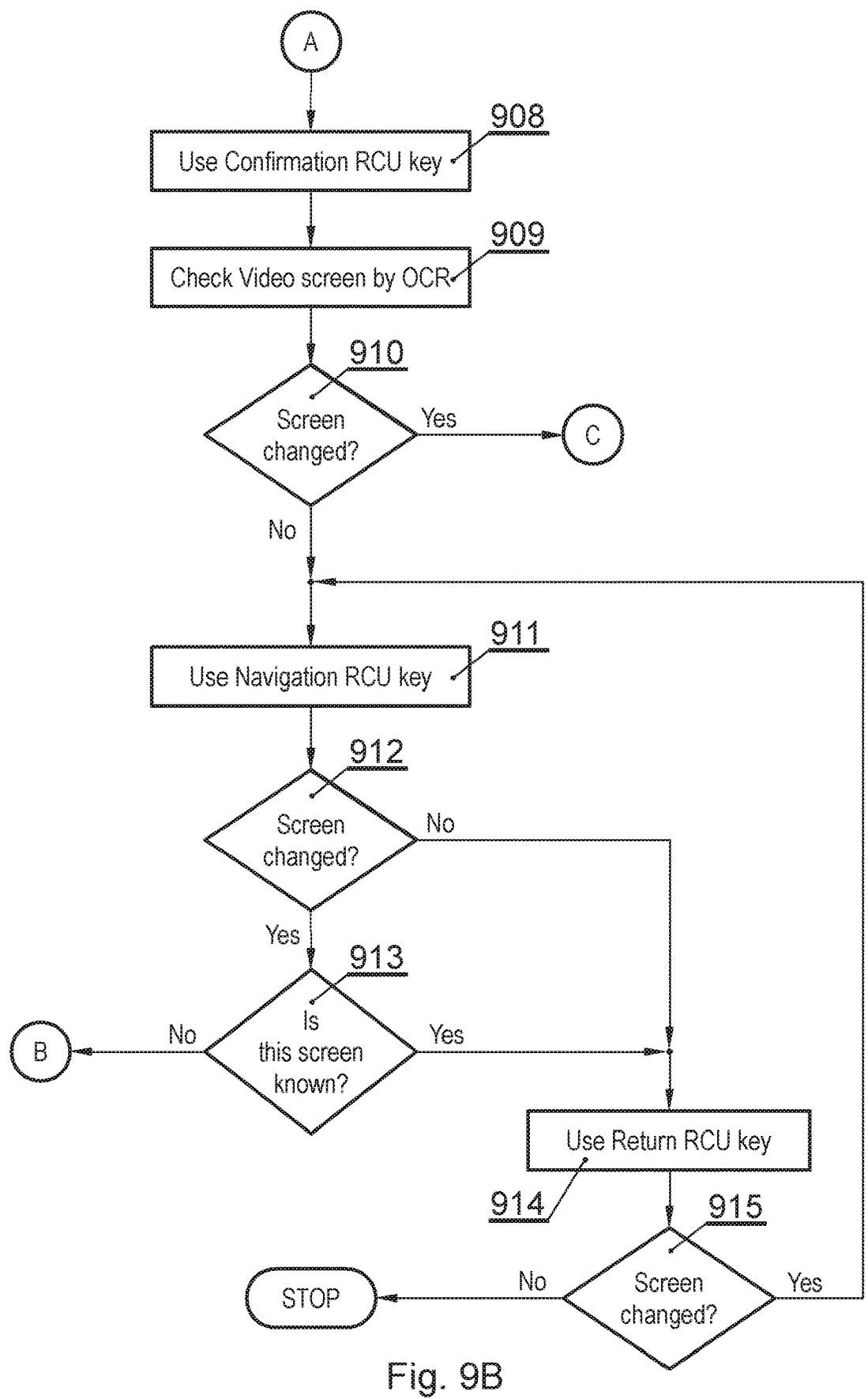

FIGS. 9A-9B present a learning function of the method according to the invention. In a first step 901 a tester provides data defining graphical user interface navigation keys, which for example can be: [left], [right], [up], [down], [confirmation/OK], and [return/back] keys. In step 902 the tester provides a definition of a [menu] key, which enables the method to navigate within the GUI. Definitions of these keys are stored in a flash memory during operation. Next, in step 903 the method uses the [menu] key in order to enter into the Menu. In step 904 a video screen is analyzed by an OCR engine. In step 905 it is checked if after using the [menu] key the screen has changed. If no, the method jumps back to step 902, otherwise the method continues to step 906, in which it stores the parent screen which is the main menu screen. Next in step 907 the screen text (header text) is stored to the file and an image is stored to the image file. In step 908 the method uses a confirmation RCU key to go deeper in the structure of the menu. Subsequently in step 909 it checks or analyzes the video screen by the OCR engine. In step 910 it is checked if the screen has changed (i.e. if it is different than the previous one), and if so, then the method jumps to step 906. If the screen has not changed, the method proceeds to step 911 in which it uses a navigation RCU key to check neighbor levels. Subsequently in step 912 it is checked if the screen has changed. If yes, then in step 913 it is checked if this screen is already known, i.e. if it is already stored as one of the files. If it is not known, the method loops back to step 906. If the changed screen is step 913 is known or if the screen in step 912 didn't change, the method moves to step 914, where it uses a return RCU key to go back to a higher level. Subsequently in step 915 it is checked if the screen has changed. If not, then the procedure terminates, otherwise it jumps back to step 911.

The operating function of the presented method will use the provided navigation, confirmation, returning and MENU RCU keys to navigate through the graphical user interface. Basing on the file with the structure of the GUI, it will be able to enter the required sub-MENU. When the tester provides the name of the screen that the tester wanted to enter, then the function will find this name in the structure file in the data storage memory and will remember the path. Depending on the depth level it will use as many navigation and confirmation keys as it needs in order to open the specified screen. When the tester provides the image file of the required screen that the tester wanted to enter, then the function will compare all known captured images with the provided one using the OCR engine and when the required one is found, it will remember its path. Depending on depth level, it will use as many navigation and confirmation keys as it needs. If the operating function during the operation finds a screen that does not fit to the structure of the GUI, then the process will be interrupted and the learning function will be applied to learn the new GUI elements. Subsequently, the operating function will be started one more time to enter the appropriate sub-MENU screen.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for automated testing of a graphical user interface for customer devices may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented method for automated testing of a graphical user interface (GUI) for a customer device, the method comprising:
receiving GUI navigation keys (801);
automated learning (802) of the GUI MENU structure by navigating the GUI to create a GUI structure file comprising the screen header text and the screen image for each sub-MENU detected in the MENU structure;
receiving (803) data related to the sub-MENU to be tested;
performing (804) a testing procedure on the sub-MENU, wherein the automated learning (802) comprises the steps of:
receiving (901) data defining navigation keys for the GUI;
receiving (902) data defining a MENU key for the GUI;
activating (903) the MENU key in order to call a main menu;
analyzing (904) a currently viewed video screen by an OCR engine;
checking (905) if the currently viewed screen is different from the previous screen and if so, storing (907) the screen header text and the screen image in the structure file;
activating (908) a confirmation key to go deeper in the structure of the MENU;
analyzing (909) the currently viewed video screen by an OCR engine;
checking (910) if the currently viewed screen is different from the previous screen and if so, returning to step (907) and if not, activating (911) one of the navigation keys to enter neighbor levels in the structure of the MENU;
checking (912) if the currently viewed screen is different from the previous screen and if so, checking (913) if the currently viewed screen is already known and if not, returning to step (907), and otherwise using (914) a return navigation key to go back to a higher level of the MENU;
checking (915) if the currently viewed screen is different from the previous screen and if so, returning to step (911).

2. The method according to claim 1, wherein receiving (803) data related to the sub-MENU includes receiving the screen header name.

3. The method according to claim 1, wherein receiving (803) data related to the sub-MENU includes receiving an image file.

4. The method according to claim 1, comprising, during automated learning (802), creating the structure file additionally comprising an identification number (id) of each screen which indicates its position in the MENU structure.

5. The method according to claim 1, comprising, during the testing procedure (804), detecting a text displayed in a particular region of the screen and comparing the text with an expected value.

6. A computer-implemented system (110) for automated testing of a graphical user interface (GUI) for a customer device, the system comprising a system unit (310) with a central processing unit (311) configured to perform the steps of the method of claim 1.

7. A non-transitory computer readable medium storing computer-executable instructions performing all the steps of the computer-implemented method according to claim 1 when executed on a computer.

* * * * *